United States Patent

Kuwabara et al.

[11] Patent Number: 5,049,774
[45] Date of Patent: Sep. 17, 1991

[54] VIBRATORY MOTOR

[75] Inventors: Yasuo Kuwabara; Naofumi Fujie, both of Nagoya, Japan; Takao Saeki, Farmington Hills, Mich.

[73] Assignee: Aisin Seiki Kabushiki Kaisha, Kariya, Japan

[21] Appl. No.: 429,470

[22] Filed: Oct. 31, 1989

[30] Foreign Application Priority Data

Oct. 31, 1988 [JP] Japan .................... 63-276579

[51] Int. Cl.$^5$ .......................................... H01L 41/08
[52] U.S. Cl. ............................................... 310/323
[58] Field of Search ............................. 310/323, 328

[56] References Cited

U.S. PATENT DOCUMENTS

| 4,678,956 | 7/1987 | Izukawa et al. | 310/323 |
| 4,692,650 | 9/1987 | Okumura et al. | 310/323 |
| 4,786,836 | 11/1988 | Tokushima | 310/323 |
| 4,831,305 | 5/1989 | Mukohjima et al. | 310/323 |

FOREIGN PATENT DOCUMENTS

| 0174078 | 9/1985 | Japan | 310/323 |
| 0035176 | 2/1986 | Japan | 310/323 |
| 63-73887 | 4/1988 | Japan | 310/323 |
| 0277480 | 11/1988 | Japan | 310/323 |
| 0097180 | 4/1989 | Japan | 310/323 |

Primary Examiner—Mark O. Budd
Attorney, Agent, or Firm—Burns, Doane, Swecker & Mathis

[57] ABSTRACT

A vibratory motor includes a rotor member having a portion of increased stiffness. A spring member presses the portion of increased stiffness of the rotor member in order to maintain a stable contact between the rotor member and the stator member. The stiffness portion distributes the pressure from the spring member uniformly along a circumference of the rotor member.

4 Claims, 1 Drawing Sheet

VIBRATORY MOTOR

BACKGROUND OF THE INVENTION

1. Field of the Invention

This invention relates to a vibratory motor which utilizes a traveling wave as a driving source.

2. Description of the Related Art

A conventional vibratory motor generates a traveling wave on a stator member and transmits energy of the vibration to a rotor member by a friction force between the stator and the rotor. Therefore, the rotor member should have a stable contact with the stator member so as to obtain a stable output.

FIGS. 2 and 3 show the conventional vibratory motor. Therein, a cone spring 53 is provided so as to press a rotor 52 to stator 51. The cone spring 53 maintains a stable contact between the stator 51 and the rotor 52.

During rotation of the rotor 52, it receives a vibratory impulse from the stator 51. As a result, the rotor 52 is vibrated in the normal direction and in the tangential direction (as shown in FIG. 3). At this time, the vibration which is generated on the rotor 52 is of the same frequency as the vibration of the stator 51. As long as the vibration of the rotor 52 is of the same frequency as the vibration of the stator 51, the output of the motor is increased in response to an increase of electric power supplied to the stator 51.

However, as soon as the supplied electric power exceeds an upper limit, the output of the motor is not increased. In this situation, a principal vibration may be generated on the rotor 52. The principal vibration weakens the vibration which has the same frequency with the stator 51.

SUMMARY OF THE INVENTION

The present invention is directed to reducing the principal vibration by the uniform distribution of pressures between the stator 51 and the rotor 52 along the circumference of the rotor 51. This means that the upper limit of the electric power supplied to the stator can be increased if the pressure could be distributed uniformly along the circumference of the rotor 52. That is to say, a higher output can be obtained from the vibratory motor due to an increased supply of more electric power to the stator than in conventional vibratory motors.

Accordingly, one of the objects of this invention is to obviate the above-discussed conventional drawbacks.

It is also an object of this invention to uniformly distribute pressure which is applied to a stator member and a rotor member along the circumference of the rotor member.

It is also the other object of this invention to increase the output from a vibratory motor.

To achieve the above objects and in accordance with the principles of the invention as embodied and broadly described herein, the vibratory motor has a rotor member and a stator member and in which a high stiffness portion is formed on the rotor member. A spring member is in contact with the portion of the rotor having the high stiffness portion.

BRIEF DESCRIPTION OF THE DRAWINGS

The accompanying drawings, which are incorporated as a part of the specification, illustrate an embodiment of the invention and serve to explain the principles of the invention. In the drawings.

DETAILED DESCRIPTION OF A PREFERRED EMBODIMENT

Reference will now be made in detail to a present preferred embodiment of the invention, an example of which is illustrated in accompanying drawings.

Figure 1:
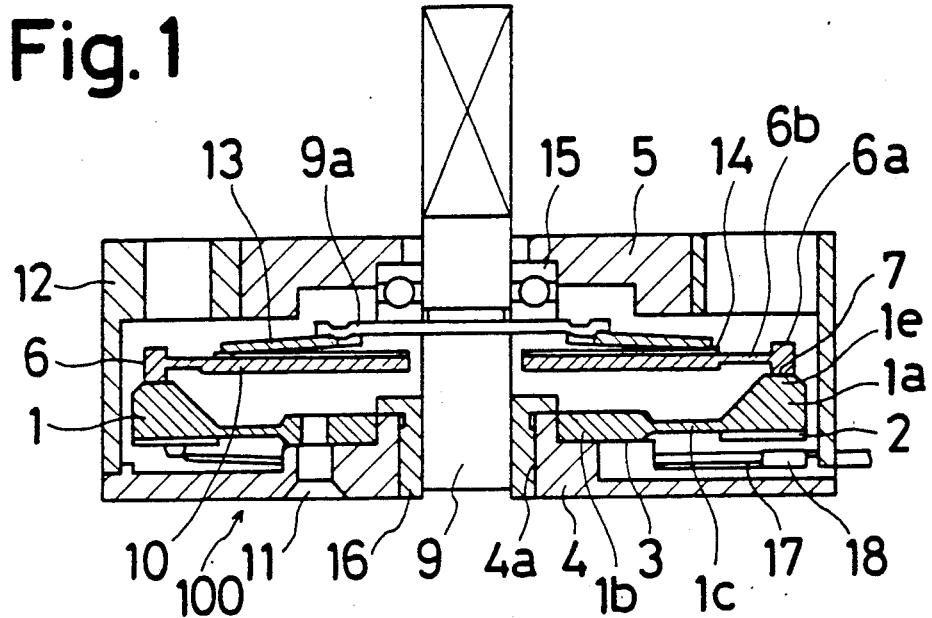
FIG. 1 is a cross sectional view of a vibratory motor including the present invention.
Figure 2:
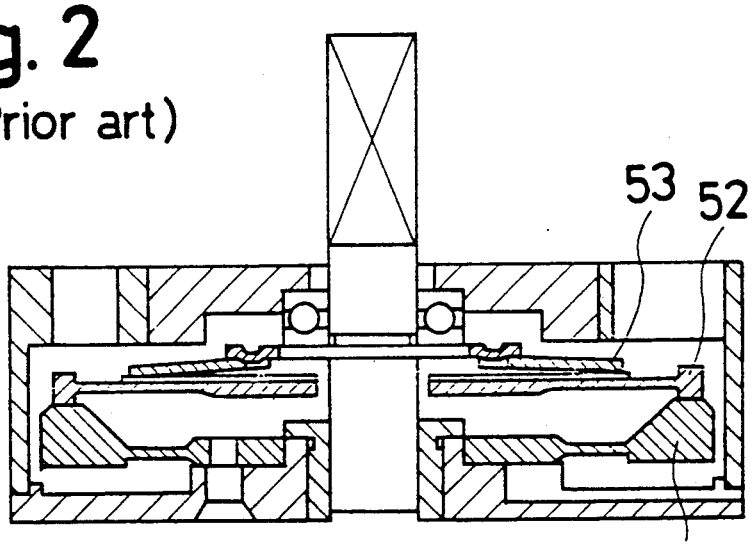
FIG. 2 is a cross sectional view of a conventional vibratory motor.
Figure 3:
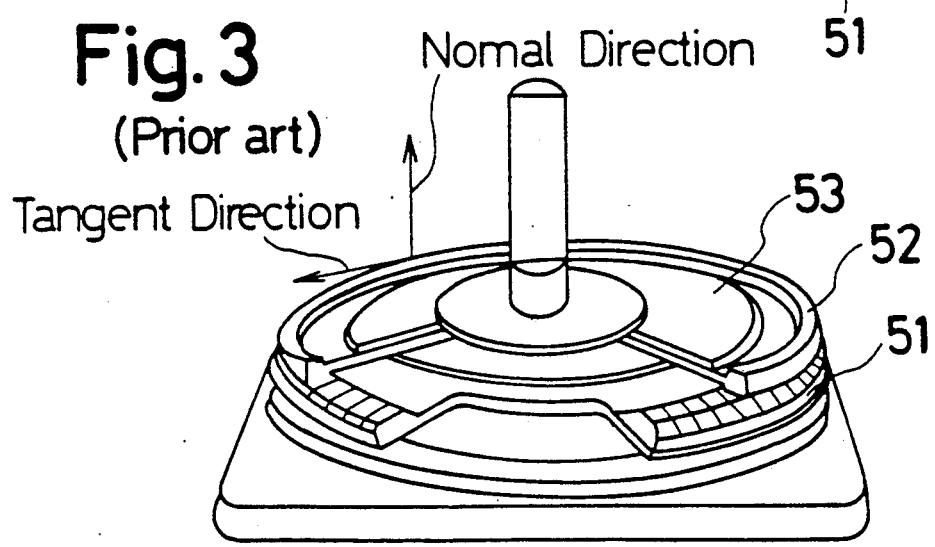
FIG. 3 is a perspective view of a conventional vibratory motor.

FIG. 1 is a cross sectional view of a vibratory motor 100. An opening 4a is provided at a center section of a disc-shaped base 4. A bearing 16 is pressed or otherwise disposed in the opening 4a.

An inner portion of a disc-shaped stator 3 is supported by the base 4. The stator 3 is fixed to the base 4 by a screw 11. The stator 3 comprises a ring-shaped elastic member 1 and a ring-shaped piezoelectric vibrator 2 secured thereto. The piezoelectric vibrator 2 is adhered to the elastic member 1 by a conductive adhesive.

The elastic member 1 includes an outer ring portion 1a, an inner ring portion 1b, and a thinner, intermediate portion 1c. The outer portion 1a and the inner portion 1b are connected integrally with the thinner portion 1c. The elastic member 1 of the stator 3 is secured to the base 4 due to its connection with the inner portion 1b by the securing elements 11. A plurality of equally spaced projections 1e are provided on the outer portion 1a. The elastic member 1 is made of a conductor which may be made of various materials, (i.e., phosphor-bronze). Thus the elastic member 1 is electrically connected to the base 4.

The piezoelectric vibrator 2 generates a travelling wave on the stator 3. Such a piezoelectric vibrator 2 for generating traveling waves is well known in the art. Therefore, the detailed explanation for the piezoelectric vibrator 2 is omitted herein. An electrode 17 is provided between the piezoelectric vibrator 2 and the base 4. The electrode 17 is electrically connected to the piezoelectric vibrator 2. A conductive wire 18 is connected to the electrode 17. The piezoelectric vibrator 2 is contracted and expanded when A.C. power is supplied between the conductive wire 17 and the base 4. When the piezoelectric vibrator 2 is contracted and expanded, the traveling waves are generated on the elastic member 1.

A cylindrical member 12 is fixed to the base 4 by a screw-threaded engagement. A cover member 5 is connected to the cylindrical member 12 by a screw-threaded engagement between the cover member 5 and the cylindrical member 12. Accordingly, the cover member 5 moves in an axial direction of the shaft 9 when the cover member 5 is rotated. The base member 4, the cylindrical member 12 and the cover member 5 constitute a housing which surrounds the vibratory motor 100.

A bearing member 15 is fixedly attached to the cover member 5. The shaft 9 is rotatably mounted in the bearings 15 and 16. The bearing 15 is in contact with the flange portion 9a of the shaft 9. The flange portion 9a prevents the shaft 9 from moving toward the cover member 5.

A rotor 6, a rubber seat 14 and a cone spring 13 are positioned between the bearing 15 and the elastic member 1. The rotor 6 and the rubber seat 14 are pressed toward the stator 3 by the spring force of the cone spring 13. The rubber seat 14 prevents an aural noise from being generated between the rotor 6 and the cone spring 13 due to oscillation of the rotor 6.

The cone spring 13 is restricted in its movement by the flange portion 9a of the shaft 9, thus the cone spring 13 is supported by the flange portion 9a coaxially with the bearing 15. Due to this arrangement, the pressure between the stator 3 and the rotor 6 can be adjusted by rotating the cover member 5, as the cover member 5 is capable of moving in the axial direction of the shaft 9.

A thickened portion 10 is formed integrally with the rotor 6. The thickened portion 10 extends along an inner side and displaced from the contact between the stator 3 and the rotor 6. The thickened portion 10 increases stiffness on the inner side of the rotor 6. The cone spring 13 presses against the rotor 6 and is in contact with the thickened portion 10. The thickened portion 10 distributes the pressure uniformly along a circumference of the rotor 6. Therefore, the rotor 6 may be uniformly bent by the pressure of the cone spring 13.

A sliding portion 6a is formed on an outer portion of the rotor 6. One surface of the sliding portion 6a extends in the direction of the outer portion 1a. A friction film 7 is pinched or otherwise held between the sliding portion 6a and the outer portion 1a. As the rotor 6 is pressed toward the stator 3, the sliding portion 6a is toward the projections 1e which formed on the outer portion 1a and against the friction film 7. A thinner portion 6b is provided between the sliding portion 6a and the thickened portion 10.

The traveling wave is generated on the elastic member 1 due to the oscillation of the piezoelectric vibrator 2, when the A.C. power is supplied to the conductive wire 18 and the base 4. The travelling wave goes around the outer portion 1a of the elastic member 1. During the movement around the outer portion, the amplitude of the travelling wave is amplified by the projections 1e. Thus the traveling wave effectively transmits a moment of rotation to the rotor 6, thereby rotating the rotor 6 with the shaft 9 when the traveling wave is generated on the elastic member 1.

When the rotor 6 is rotated, the rotor 6 receives a supersonic vibration from the elastic member 1. As a result, the rotor 6 vibrates in a normal direction and a tangential direction. At this time, the vibration of the rotor 6 has the same frequency as the vibration of the elastic member. As long as the vibration of the rotor 6 is of the same frequency as the vibration of the elastic member 1, output from the motor 100 is increased in response to an increase of electric power supplied to the piezoelectric vibrator 2.

As the electric power is increased gradually, the vibration on the rotor 6 is intensified gradually. In the embodiment of the present invention, a principal vibration is difficult to be generated against the extremely large electric power supplied to the piezoelectric vibrator 2, due to the pressure between the elastic member 1 and the rotor 6 being distributed uniformly along the circumference of the rotor 6. Therefore, an extremely large output can be obtained by supplying an extremely large electric power supplied to the piezoelectric vibrator 2.

As an example, 1.2 times of an output could be obtained by this embodiment compared to the conventional vibratory motor which does not have thickened portions 1. In a present embodiment, the vibratory motor 100 includes a rotor of 80 mm diameter and, a thickened portion 10 of 65 mm diameter.

Further, aural noise from the vibratory motor 100 was reduced due to reduction of the principle vibration of the rotor 6. Therefore, a very quiet vibratory motor 100 is provided.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A vibratory motor comprising:
   a stator means for generating a traveling wave;
   a rotor member in contact with the stator means and driven by the traveling wave;
   a portion of the rotor member being of increased stiffness provided by a thickened portion of the rotor member relative to another portion of the rotor member;
   a sliding portion of the rotor member being in sliding contact with an elastic member of said stator;
   a thinner portion of the rotor member being defined between said thickened portion and said sliding portion; and
   a spring member in contact with the rotor member at the high stiffness portion, said spring member pressing the rotor member to the stator means.

2. A device as in claim 1, wherein the stator means includes:
   a piezoelectric vibrator for generating said traveling wave on the elastic member.

3. A device as in claim 2, wherein the portion of increased stiffness is in contact with the spring member on a side opposite the contact between the elastic member and the rotor member.

4. A device as in claim 1, wherein the spring member is a cone spring.

* * * * *